United States Patent [19]

Carr et al.

[11] 3,995,889
[45] Dec. 7, 1976

[54] DREDGE FLOATING PONTOON PIPE-LINE JOINT

[75] Inventors: John S. Carr, Palos Park; George Pelton, Chicago, both of Ill.

[73] Assignee: Hydro-Dredge Accessory Co., Rosemont, Ill.

[22] Filed: May 22, 1975

[21] Appl. No.: 579,863

[52] U.S. Cl. .................................. 285/91; 285/94; 285/261; 285/360
[51] Int. Cl.² ......................................... F16L 27/06
[58] Field of Search ............ 285/261, 91, 360, 404, 285/94; 403/122, 123, 143, 141

[56] References Cited
UNITED STATES PATENTS

| | | | |
|---|---|---|---|
| 210,910 | 12/1878 | Brady | 285/261 |
| 1,128,474 | 2/1915 | Martz | 285/91 |
| 1,946,110 | 2/1934 | Plummer | 285/261 |
| 2,456,744 | 12/1948 | Sjoberg | 285/261 |
| 3,276,796 | 10/1966 | Daniel | 285/261 |
| 3,456,371 | 7/1969 | Graham et al. | 285/261 X |

FOREIGN PATENTS OR APPLICATIONS

| | | | |
|---|---|---|---|
| 132,702 | 5/1949 | Australia | 285/261 |

Primary Examiner—Thomas F. Callaghan
Attorney, Agent, or Firm—Allegretti, Newitt, Witcoff & McAndrews

[57] ABSTRACT

The improved dredge floating pontoon pipe-line ball joint disclosed is adapted for releasably connecting adjacent ends of two conduit sections which are part of a dredge line. The improved ball joint includes: a ball member secured to an end of one of the conduit sections; a socket member secured to an end of the other conduit section and adapted to fit about at least a portion of the ball member; and a ring mounted on the ball member and moveable with respect to and on the ball member so as to permit relative, universal movement between the two conduit sections. A plurality of retention pins are carried by the ring at spaced intervals about the ring and are utilized to retain the ring on the ball member particularly during assembly and disassembly of the improved joint.

A novel cooperating hook member and lug arrangement is utilized for locking the ring and socket member together, and for interconnecting the ends of the conduit sections. This arrangement includes a novel means for preventing accidental unlocking of the ring and socket member during usage.

11 Claims, 6 Drawing Figures

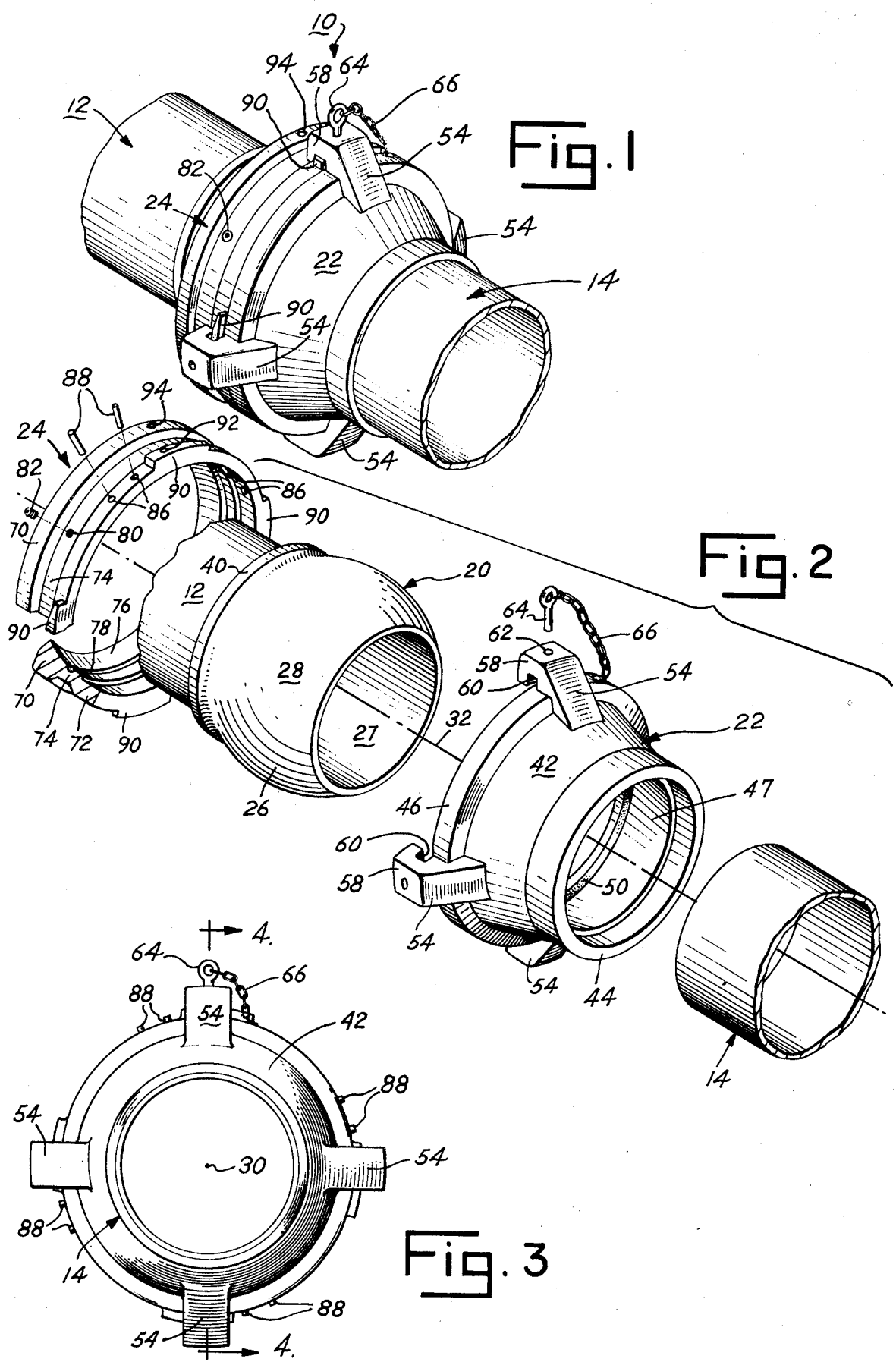

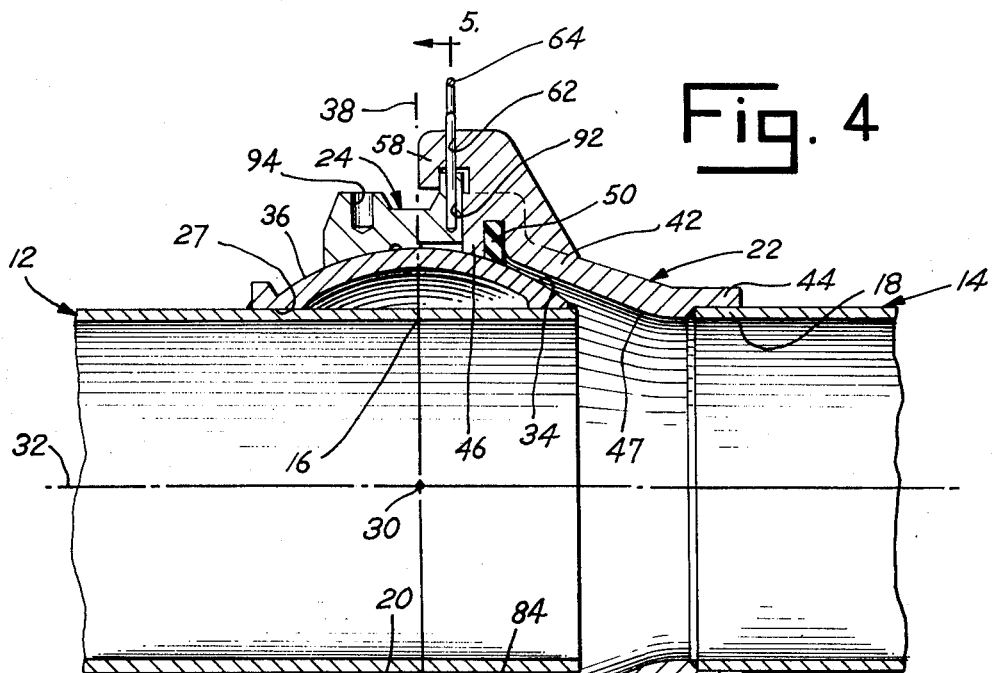
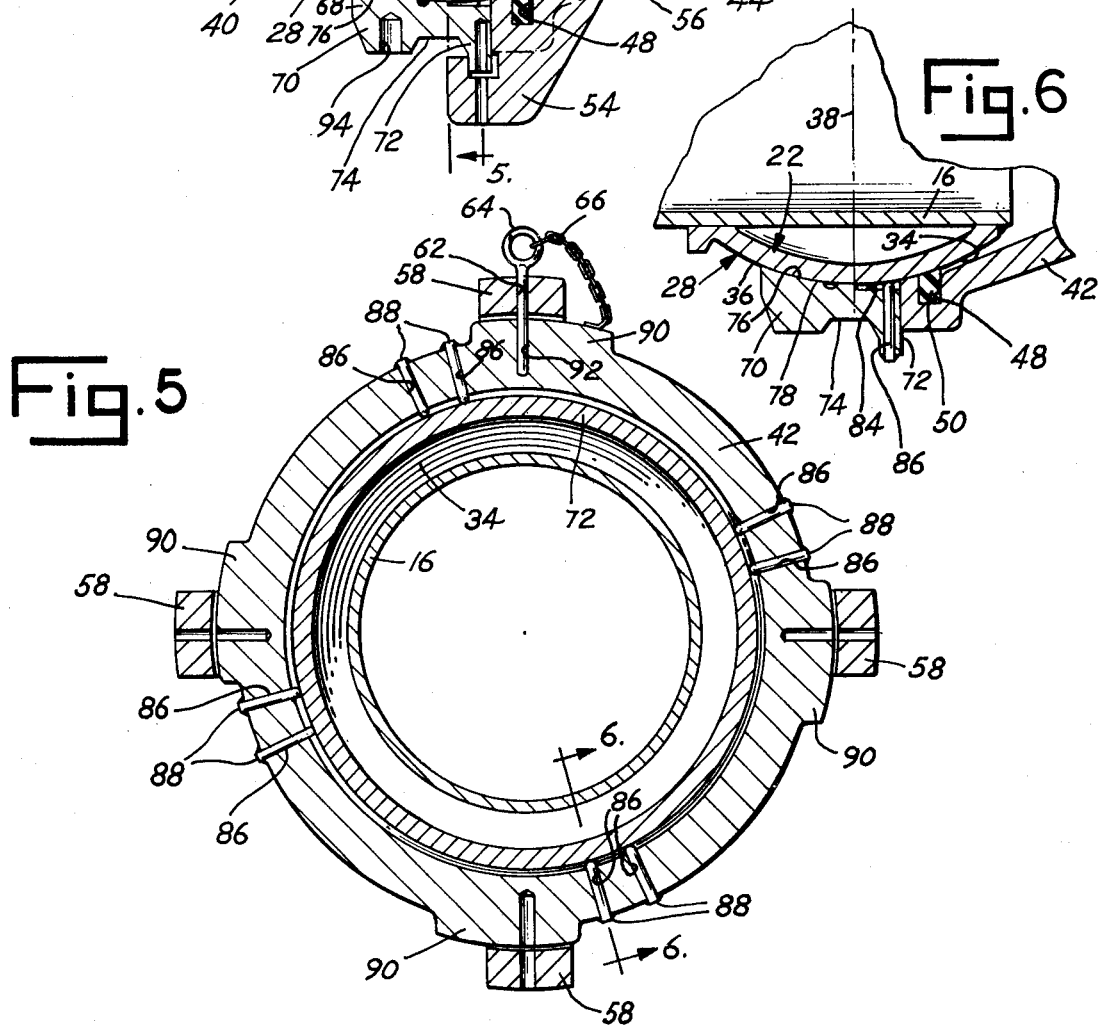

DREDGE FLOATING PONTOON PIPE-LINE JOINT

BACKGROUND AND SUMMARY OF THE INVENTION

This invention relates to an improved dredge, floating pontoon pipe-line joint, and more particularly, to an improved dredge floating pontoon pipe-line ball joint for releasably connecting the adjacent ends of two conduit sections in a pipe-line which is supported by floating pontoons and which is utilized to convey sand and sediment in suspension during dredging operations and for permitting relative, universal movement between the adjacent, connected ends of the conduit sections.

Ball joints have been utilized for a number of years to connect the ends of two conduit sections employed in dredge pontoon lines. While the prior ball joints have embodied a variety of different designs and constructions, they have generally included: a ball member secured to an end of one of the conduit sections and having an annular, generally spherical shaped outer surface; a socket member secured to an end of the other conduit sections; a ring mounted on the spherical surface of the ball member; and means, usually carried by the ring and the socket member, for locking the ring and socket member so as to interconnect the ends of the two conduit sections. Because of their intended use, the ball joints tend to be quite large and heavy. For example, the pipe diameters of "standard size" ball joints have generally run from a 12 inches to 36 inches and in the larger diameter ball joints, the ring may, for instance, weigh as much as 3000 pounds.

One of the longstanding problems relating to ball joints used for dredge pontoon lines is that when connecting and disconnecting a conventional ball joint, there was a tendency for the ring to be "bumped" or "knocked" off of the spherical surface of the ball member, i.e., to slide back on the ball and onto conduit section, as the forward portion of the ring does not grip the spherical surface of the ball member on the forward side of the transverse centerline of the ball member. Thus, when reconnecting the ball joint, the ring has to be raised into place. In the larger size ball joints, the ring is quite heavy and it is often impossible for a man to lift it. Consequently, additional lifting facilities must be utilized at each ball joint of the floating pipe-line and in many instances there could be more than twenty ball joints in a pipe-line. This problem was and is annoying and time consuming and is one which is potentially dangerous in that it may lead to property damage and to personal injury to workers assembling or disassembling the ball joint. Others have attempted to solve this problem by designing and construction rings which fit "over center" on the ball members, i.e., have surfaces which contact the outer spherical surface of the ball member on both sides of the center line or more correctly, the transverse center plane of the ball member. While a number of designs for "such over the center" rings have been proposed, the rings have been relatively expensive to manufacture and maintain and have been difficult to mount on and dismount from the ball member.

It is a primary object of the present invention to provide an improved ball joint which is adapted for releasably connecting the ends of two conduit sections utilized in a dredge pontoon line and which affords a unique, practical solution to the aforementioned longstanding problem. In addition, our improved ball joint includes a novel means for preventing the accidental unlocking of the ball joint during usage.

More specifically, the improved ball joint of our present invention includes a ball member adapted to be secured to an end of one of the two conduit sections to be interconnected, a socket member adapted to be secured to an end of the other conduit section, a novel ring mounted on the ball member, and novel means for retaining the ring on the ball member. The ball member has an annular, outwardly facing surface formed in the shape of a first spherical sector, with the center of the spherical sector lying on the longitudinal central axis of the one conduit section. This outwardly facing surface is divided into a forward portion and a rearward portion by an imaginary, transverse plane that includes the center of the first spherical sector and that is perpendicular to the longitudinal central axis of the one conduit section.

The ring includes first and second annular sections which are integrally interconnected by a central reduced diameter section. The first annular section has an inwardly facing surface which is formed in the shape of a second spherical sector and which is in surface to surface contact with the rearward portion of the outwardly facing surface of the ball member. The second annular section of the ring has an annular inwardly facing surface which overlies, is adjacent to but is spaced from the forward portion of the outwardly facing surface of the ball member. The retaining means includes a plurality of pins that are carried by the second ring section and that contact the forward portion of the outwardly facing surface of the ball member. As a result of the use of these retention pins, the ring cannot be moved or bumped out of surface to surface contact with the ball member although relative surface to surface movement between the ring and the ball member is permitted.

Our improved ball joint, including the novel ring and retaining means, has a number of significant advantages over prior ball joints. The retention pins can be readily inserted in or removed from the ring, and without the retention pins, the ring is adapted for facile mounting on and dismounting from the ball member. The use of the retention pins permits the ring to have a relatively simple design and configuration and this, in turn, permits the ring to be manufactured relatively inexpensively. Moreover, the retention pins, themselves, are inexpensive and can be relatively quickly and easily replaced when worn. The use of the retaining pins also reduces the overall weight of our ball joint particularly as compared to prior joints employing "over the center" ring constructions.

Our improved ball joint also utilizes a novel means for interlocking the ring and the socket member and for assuring that these members cannot accidentally become unlocked during usage. In this regard, the socket member of our improved ball joint includes a plurality of hook members which project from the socket member and are adapted to engage a plurality of radially outwardly extending, tapered lugs on the outwardly facing surface of the ring. Engagement occurs between the lug and the ends of the hook members as a result of the rotation of the ring, about the central longitudinal axis of the first conduit, relative to the socket member. The vertical pair of the engaged lugs and hook members includes radially directed, coaxial bores which are adapted to receive a locking eye bolt. When disposed in these bores, the locking bore prevents relative rotational movement between the ring and the socket, and thus prevents disengagement of the locking means. The principal advantage of this novel locking means, from the standpoint of commercializing our improved ball joint, is its simplicity and the fact that it does not require the usage of nuts and bolts and the like.

These and other objects, advantages and features of the present invention will become apparent in the following description of the preferred embodiment of our present invention.

DESCRIPTION OF THE DRAWINGS

FIG. 1 is a perspective view of an improved ball joint embodying the principles of our present invention.

FIG. 2 is a exploded view of the improved ball joint shown in FIG. 1.

FIG. 3 is an end view of the improved ball joint of FIG. 1.

FIG. 4 is a cross-sectional view taken along the line 4—4 in FIG. 3.

FIG. 5 is a cross-sectional view taken along the line 5—5 in FIG. 4.

FIG. 6 is a partial, cross-sectional view taken along the line 6—6 in FIG. 5.

Throughout the various figures of the drawings, the same referenced numerals will be used to designate the same parts or components. Moreover, when the terms "right", "left", "right end", "left end", "forward", "rearward", "inner" and "outer" are used herein, it is to be understood that these terms have reference to the structure shown in the drawings as it would appear to a person viewing the drawings.

DESCRIPTION OF THE PREFERRED EMBODIMENT

Referring now to FIGS. 1–6, an improved ball joint embodying the principles of our present invention is shown generally at 10. The ball joint 10 is utilized to interconnect two conduit sections 12 and 14 in a dredge pontoon line utilized to convey sand and sediment in suspension during dredging operations. More specifically, the ball joint is utilized to interconnect adjacent ends 16 and 18 of the conduit sections 12 and 14, respectively, so that the ends 16 and 18 will not separate or leak during dredging operation and so that limited universal, relative movement is permitted between the ends 16 and 18 of the conduit sections 12 and 14. The ball joint 10 includes the three principal components: a ball member 20, a socket member 22, and a ring 24, each of which will be hereinafter described in detail.

The ball member 20 includes an annular body 26 which has an opening 27 therethrough. The dimensions of the opening 27 are selected so that the ball member body 26 may be slipped over the end 16 of the conduit section 12 and secured thereto by welding or the like. The body 26 has an annular, continuous, outwardly facing surface 28 formed in the shape of a first spherical sector which has its center located at a point, indicated by the reference numeral 30 in FIGS. 4 and 5, lying on the longitudinal central axis, indicated by reference numeral 32, of the conduit section 12.

As best shown in FIG. 4, the outwardly facing surface 28 of the ball member body 26 may be considered as having a forward portion 34 and a rearward portion 36, with the line of division between the portions 34 and 36 being an imaginary transverse plane, indicated by reference numeral 38 in FIG. 4, which is perpendicular to the longitudinal axis 32 and which includes the center 30 of the outwardly facing surface 28. It should be stressed, however, that the division of the surface 28 into the two portions 34 and 36 is not a physical division in the sense that there is no physical separation or line of demarkation between these two portions.

An integral, annular flange 40 is formed about the rear end of the ball member body 26. As described in more detail hereinafter, the flange 40 serves to limit the arc through which the ring 24 may pivot or move relative to the ball member 20.

The socket member 22 includes a tubular, generally bell-shaped body which is secured, by welding or the like, at its one, smaller diameter end 44 to the end 18 of the conduit section 14. The other, larger diameter end 46 of the socket member body 42 is adapted to fit over the forward portion 34 of the ball member 20, although the diameter of the inwardly facing surface 47 of the body 42, adjacent to the end 46, is less than the diameter of the outwardly facing surface 28 adjacent to the transverse plane 38.

An annular groove 48 is formed in the body 42 adjacent to its end 46, and opens radially inwardly. A conventional annular sealing gasket 50 is disposed in the groove 48. As best shown in FIGS. 4 and 6, the gasket 50 is adapted to have its distal end contact or engage the forward portion 34 of the surface 28 of the ball member 22 and to provide a seal therebetween which prevents the sand and sediment in suspension from passing around the gasket and between the surface 28 and the ring 24. The portion of the inwardly facing surface 47 of the socket member body 42, which is disposed between the groove 48 and the end 44 and which overlies the portion 34, is spaced from the outer surface 28 of the ball member 20 so as to minimize the possibility of any sand or sediment collecting therebetween.

Four hook members 54 are integrally formed on the outer facing surface 56 of the socket member body 42 adjacent to the end 46. The hook members 54 are disposed, at 90° intervals, about the end 46 and project radially outwardly and to the rear from the outer surface 56 of the body 42 so that the rearward ends 58 of the hook member 54 are disposed to the rear of the end 46. Each of the ends 58 of the hook members 54 includes a radially inwardly directed slot or groove 60 which is adapted to interlock with the ring 24 as hereinafter described. One of the hook members 54 also has a radially directed bore 62 in its end 58. The bore 62 communicates, at its inner end, with the slot 60 formed in the end 58. An eye bolt 64 is secured to the body 42, by a keeper chain 66, adjacent to the hook member 54 having the bore 62 therein. The dimensions of the bore 62 and the eye bolt 64 are selected so that the eye bolt 64 can be selectively disposed in the bore 62 are hereinafter described.

The ring 24 includes a one piece annular body 68 having a first, rearwardly disposed section 70 and a second fowardly disposed section 72. A central, reduced diameter section 74 is disposed between the sections 70 and 72. An inwardly facing surface 76 is formed on the section 70 in the shape of a second spherical sector which has substantially the same radius of curvature as the outwardly facing surface 28 of the ball member 22. When the ring 24 is mounted on the ball member 20 so that the surface 76 is in surface to surface contact with the surface 28 of the ball member body 26, the center of the second spherical section, which defines the surface 76, coincides with the center 30.

An annular lubrication groove 78 is formed in the surface 76 so as to introduce lubrication between the surfaces 28 and 76 and thereby facilitate relative, surface to surface movement between the ring 24 and the ball member 20. A generally radially directed bore 80 is dirlled in the body 68 and permits lubrication to be introduced into the groove 78. The bore 80 is normally closed by a set screw 82 or the like.

The inwardly facing surface 84 of the second section 72 of the ring body 68 is adjacent to, overlies but is spaced from the forward portion 34 of the surface 28 of the ball member body 26 so that there is and can be no contact between the surfaces 26 and 84. When, as shown in FIG. 4, the ring is mounted on the ball member 20 so that the surface 76 is in surface to surface contact with the surface 28, the inwardly facing surface 84 of the second element overlies a part of the forward portion 34 of the surface 28, i.e., the part adjacent to but forward of the transverse plane 38.

Four pairs of radially directed bores 86 are drilled in the second ring section 72. The pairs of bores 86 are spaced, at 90° intervals, about the second section and all the bores 86 are located in the same transverse plane perpendicular to the longitudinal central axis 32. A retention pin 88 is adapted to be disposed in each of the bores 86 and to be secured therein by having its radially outwardly directed ends welded to the ring section 72. The length of the retention pins 88 are selected so that the radially inwardly directed ends of the pins 88 are disposed in contact with the forward portion 34 of the ball member surface 28. This contact between the inner ends of the retention pins 88 and the surface 28 prevents the ring 24 from being bumped or knocked off of the ball member, i.e., from being moved so that the ring surface 76 is no longer in surface to surface contact with the ball member surface 28, although it does not prevent relative, surface to surface movement, about the center 30, between the ring surface 76 and the ball member surface 28. Such relative pivotal or angular relative movement is desirable to facilitate the interconnection of the ends of the conduit sections 12 and 14 during the assembly of the ball joint 10, and also to permit relative universal movement between the conduit sections. This pivotal or angular relative movement is, however, limited by the flange 40 which permits the ring 24 to pivot or be moved, relative to the ball member 20, through an arc of approximately 16°.

As noted above, the use of the retention pins 88 has several significant advantages from a commercial standpoint. During the initial assembly of the ball joint 10, the ring 24 can be readily moved over the flange 40 and into its normal position on the ball member 20 wherein the ring surface 76 is in surface to surface contact with the ball member surface 28. Thereafter the retention pins 88 can be introduced into the bores 86 and welded in place. Similarly, when it is desired to disassemble the ball joint 10, the retention pins 88 can be removed from the bores 86 and the ring 24 can be then easily slipped off of the ball member 20.

Four lugs 90 are integrally formed on the radially outwardly facing surface of the second ring section 72 of the ring 24. These lugs 90 are disposed about the second section 72 at intervals of 90° and have a thickness, in a direction parallel to the longitudinal axis 32 that is less than the width of the slots 60 in the ends 58 of the hook members 54. The lugs 90 are positioned on the second section 72 so that they may be engaged by the hook members 54 or, more specifically, so that they may be disposed within the slots 60 upon relative rotation of the ring 20, about the longitudinal axis 32, with respect to the socket member 22. The rearwardly facing surface of the lugs 90 are tapered, all in the same direction, so that upon continued rotation of the ring 20, after initial engagement of the lugs 90 within the slots 60, tends to draw the ring 20 toward the end 46 of the socket member 22 and so that when the lugs are fully engaged by the hook members 54, the second section 72 abutts the end 46 of the socket member 22. One of the lugs 90 has a radially outwardly directed bore 92 drilled therein, and this bore 92 is adapted to be aligned with the bore 62 in the end 58 of the hook member 54 when the lugs and hook members are fully engaged. The bore 92 has the same diameter as the bore 62, and thus the inwardly directed end of the eye bolt 64 may be disposed therein when the bores 62 and 92 are aligned. When the eye bolt 64 is disposed in the bores 62 and 92, the ring 24 cannot thereafter be rotated relative to the socket member 22 and consequently there can be no accidental disengagement of the lugs 90 and hook members 54. In other words, when the eye bolt 64 is in the bores 62 and 92, the ring 24 and socket member 22 cannot become accidentally unlocked.

Since the ring 24 may be of considerable size and weight, a plurality of radially outwardly directed bores 94 are formed in the outwardly facing surface of the first section 70 of the ring 24 to facilitate rotation of the ring with respect to the ball member 20. These bores 94 are dimensioned so as to be adapted to receive the end of a round bar or similar tool which may be utilized to assist in rotating the ring.

In view of the foregoing, it should be readily apparent to those having skill in this art that our improved ball joint 10 affords significant advantages over the prior art ball joints. Our ball joint 10 utilizes a minimal number of parts and because of the simplicity of the design and configuration of these parts, can be manufactured relatively inexpensively. The ball joint 10 includes novel retention pin means which are inexpensive to manufacture and maintain and which permit the facile mounting and dismounting of the ring from the ball member while assuring that the ring can never be inadvertently knocked or bumped off of the ball member during assembly or disassembly of the joint. Moreover, the ball joint includes a simple yet secure method of locking the ring to the socket member and for assuring that the ring and socket member will never become accidentally unlocked during usage of the joint.

It should also be apparent to those having skill in the art that certain modifications or changes could be made in our improved ball joint 10, as described above. For example, additional bores, such as the bore 92, could be formed in each of the lugs 90 and this would eliminate the need for rotating the ring 24 so as to align the bores 62 and 92 prior to the actual engagement of the lugs 90 by the hook members 54. Similarly additional bores, similar to the bore 62, could be formed in the other hook members 54 and additional eye bolts 64 could be employed. In addition, the location and number of the retention pins 88 utilized could be modified although it is thought that the pins should always be spaced evenly about the ring 24.

Thus, since the invention disclosed herein may be embodied in other specific forms without departing from the spirit or central characteristics thereof, the preferred embodiment described therein is therefor to be considered in all respects as illustrative and not restrictive the scope of the invention being indicated by the appended claims, rather than by the foregoing description, and all changes which come within the meaning and range of equivalency of the claims are therefor intended to be embraced therein.

We claim:

1. In a dredge pontoon line, an improved ball joint adapted to releasably connect adjacent ends of two conduit sections in the dredge pontoon line utilized to convey sand and sediment in suspension during dredging operations, the improved ball joint comprising:

a ball member adapted to be secured to the end of one of the conduit sections, the ball member having an opening therethrough coaxial with the longitudinal central axis of the one conduit section and having an annular, outwardly facing surface formed in the shape of a first spherical sector, with the center of the first spherical sector lying on the central longitudinal axis of the one conduit and with the outwardly facing surface of the ball member being divided, by an imaginary transverse plane that includes the center of the first spherical sector and that is perpendicular to the longitudinal central axis, into a forward portion that faces toward the other conduit and rearward portion that faces away from the other conduit;

a ring mounted on the ball member and including first and second annular sections, a first annular section having an annular, inwardly facing surface which is formed in the shape of a second spherical sector having a radius of curvature substantially equal to the radius of curvature of the first spherical sector, and which is in surface to surface contact with the rearward portion of the outwardly facing surface of the ball member, and the second annular section having annular inwardly facing surface which overlies, is adjacent to but is spaced from the forward portion of the outwardly facing surface of the ball member and being disposed, with respect to the ball member, so that there is no contact between the second annular section and the forward portion of the outwardly facing surface of the ball member;

means carried by the second annular section of the ring for retaining the inwardly facing surface of the first annular section of the ring in surface to surface contact with the rearward portion of the outwardly facing surface of the ball member while permitting relative, universal, surface to surface movement between the inwardly facing surface of the first annular section of the ring and the rearward portion of the outwardly facing surface of the ball member, the retaining means including a plurality of retaining pins carried by the second annular section of the ring at spaced intervals about the second annular section of the ring, with one end of each of the retaining pins being secured to the second annular section, and with the other end of each of the retaining pins being in contact with the forward portion of the outwardly facing surface of the ball member;

a socket member having a first end adapted to be secured to the end of the other conduit section and a second end adapted to fit about at least a portion of the outwardly facing surface of the ball member; and means for selectively locking the ring and the socket member.

2. The improved ball joint described in claim 1, wherein a plurality of bores are formed in the second annular section of the ring at spaced intervals about the ring, with the axes of the bores intersecting the longitudinal central axis of the one conduit section; and wherein a retaining pin is mounted in and extends through each of the bores.

3. The improved ball joint described in claim 1 wherein the socket member includes an annular groove; wherein a gasket is disposed in and carried by the groove; and wherein the gasket is in sealing contact with the forward portion of the outwardly facing surface of the ball member.

4. The improved ball joint described in claim 3 wherein the retaining pins contact the forward portion of the outwardly facing surface of the ball member between the line of contact between the gasket and the forward portion of the outwardly facing surface of the ball member, and the imaginary transverse plane that includes the center of the first spherical sector and that is perpendicular to the longitudinal central axis of the one conduit section.

5. The improved ball joint described in claim 1 wherein the locking means includes: a plurality of hook members which are spaced about the outwardly facing surface of the second end of the socket member and whose distal ends are hook shaped and project, toward the one conduit section, beyond the second end of the socket member; a plurality of a radially outwardly extending lugs spaced about the outwardly facing surface of the ring, each lug being adapted to be engaged by a distal end of a hook member so as to prevent relative movement, parallel to the central longitudinal axis of the one conduit section, between the ring and the socket member; and means for selectively preventing relative, rotational movement between the ring and socket member while the distal ends of the hook members are engaged with the lugs.

6. The improved ball joint described in claim 5 wherein the lugs and the distal ends of the hook members have mating cam surfaces which are adapted to force the ring to move toward the second end of the socket member during engagement of the distal ends of the hook members and the lugs, and wherein the means for preventing relative, rotational movement between the ring and the socket member includes: aligned radially directed bores in one of the lugs and in one of the distal ends of the hook members; and a pin that is selectively disposable in the aligned bores.

7. The improved ball joint described in claim 2 wherein the locking means includes: a plurality of hook members which are spaced about the outwardly facing surface of the second end of the socket member and whose distal ends are hook shaped and project, toward the one conduit section, beyond the second end of the socket member; a plurality of a radially outwardly extending lugs spaced about the outwardly facing surface of the ring, each lug being adapted to be engaged by a distal end of a hook member so as to prevent relative movement, parallel to the central longitudinal axis of the one conduit section, between the ring and the socket member; and means for selectively preventing relative, rotational movement between the ring and socket member while the distal ends of the hook members are engaged with the lugs.

8. The improved ball joint described in claim 7 wherein the socket member includes an annular groove; wherein a gasket is disposed in and carried by the groove; and wherein a portion of the gasket is in sealing contact with the forward portion of the outwardly facing surface of the ball member.

9. The improved ball joint described in claim 8 wherein the one end of the retaining pins contact the forward portion of the outwardly facing surface of the ball member between the line of contact between the gasket and the forward portion of the outwardly facing surface of the ball member and the imaginary, transverse plane that includes the center of the first spherical sector and that is perpendicular to the central longitudinal axis of the one conduit section.

10. The improved ball joint described in claim 9 wherein the lugs and the distal ends of the hook member having mating cam surfaces which are adapted to force the ring to move toward the second end of the socket member during engagement of the distal ends and the lugs; and wherein the means for preventing relative, rotational movement between the ring and the socket member includes: aligned radially directed bores in one of the lugs and in one of the distal ends of the hook members; and a pin that is selectively disposable in the aligned bores.

11. The improved ball joint described in claim 10 wherein an annular lubrication groove is formed in the inwardly facing surface of the first part of the ring; and wherein the first and second annular sections of the ring are integrally interconnected by an annular, reduced diameter section.

* * * * *